United States Patent [19]
Engelhardt et al.

[11] Patent Number: 5,731,365
[45] Date of Patent: Mar. 24, 1998

[54] HYDROPHILIC, HIGHLY SWELLABLE HYDROGELS

[75] Inventors: Fritz Engelhardt, Frankfurt am Main; Norbert Herfert, Altenstadt; Uwe Stüven, Bad Soden; Ulrich Riegel, Frankfurt am Main; Rüdiger Funk, Niedernhausen; Detlev Seip, Kelkheim, all of Germany

[73] Assignee: Hoechst AG, Frankfurt, Germany

[21] Appl. No.: 504,130

[22] Filed: Jul. 19, 1995

[30] Foreign Application Priority Data

Jul. 22, 1994 [DE] Germany ............... 44 26 008.3

[51] Int. Cl.[6] .................. C09K 17/00; B01J 20/32; C08J 3/075
[52] U.S. Cl. .................. 523/206; 523/201; 523/205; 524/35; 524/47; 524/560; 524/563; 524/916; 525/54.23; 428/407
[58] Field of Search ................. 523/201, 205, 523/206; 524/35, 47, 563, 560, 916; 525/54.23; 428/54.26, 407

[56] References Cited

U.S. PATENT DOCUMENTS

| 4,427,836 | 1/1984 | Kowalski et al. | 523/201 |
| 4,979,946 | 12/1990 | Gilman. | |
| 5,210,113 | 5/1993 | Waters | 523/205 |
| 5,248,709 | 9/1993 | Brehm. | |
| 5,278,203 | 1/1994 | Harms | 523/200 |
| 5,331,059 | 7/1994 | Ebert. | |
| 5,567,744 | 10/1996 | Nagata et al. | 525/200 |

FOREIGN PATENT DOCUMENTS

| 1082429 | 2/1994 | Canada. |
| 0 321 755 | 6/1989 | European Pat. Off.. |
| 641835 | 3/1995 | European Pat. Off.. |
| 4 138 408 | 5/1993 | Germany. |
| 05320523 | 12/1993 | Japan. |
| 239097 | 1/1995 | Taiwan. |
| 2 046 275 | 11/1980 | United Kingdom. |
| 09324575 | 12/1993 | WIPO. |

Primary Examiner—Andrew E. C. Merriam
Attorney, Agent, or Firm—Connolly & Hutz

[57] ABSTRACT

The present invention relates to hydrophilic, highly swellable hydrogels which are coated with non-reactive, water-insoluble film-forming polymers.

10 Claims, No Drawings

HYDROPHILIC, HIGHLY SWELLABLE HYDROGELS

The present invention relates to hydrophilic, highly swellable hydrogels which are coated with non-reactive, water-insoluble film-forming polymers.

Hydrophilic hydrogels which can be obtained by polymerization of olefinically unsaturated acids, such as, for example, acrylic acid, methacrylic acid, acrylamidopropane-sulphonic acid and the like, in the presence of small amounts of poly-olefinically unsaturated compounds are already known and are described, for example, in U.S. Pat. No. 4,057,521, U.S. Pat. No. 4,062,817, U.S. Pat. No. 4,525,527, U.S. Pat. No. 4,286,082, U.S. Pat. No. 4,340,706 and U.S. Pat. No. 4,295,987.

Hydrophilic hydrogels which are accessible by graft copolymerization of olefinically unsaturated acids on various matrices, such as, for example, polysaccharides, polyalkylene oxides and derivatives thereof, are furthermore also known (for example U.S. Pat. No. 5,011,892, U.S. Pat. No. 4,076,663 and U.S. Pat. No. 4,931,497).

The hydrogels mentioned are distinguished by a high absorption capacity for water and aqueous solutions and are therefore preferably used as absorbents in hygiene articles.

It is already known that the properties of these hydrogels can be modified by treatment of the surface with certain substances. For this purpose, conventional hydrogels, which are dried, ground and, if appropriate, sieved, are reacted in powder form with reactive compounds, i.e. with compounds which contain at least two groups which can form covalent bonds with the carboxyl groups of the hydrogels. This is thus a crosslinking, which takes place on the surface of the gel particles.

Such surface crosslinking is described, for example, in EP-A 543 303, mixtures of phosphonic acid diglycidyl esters and other reactive compounds being employed as surface crosslinking agents.

Numerous other processes describe the surface treatment and crosslinking of absorbent and swellable polymer particles with reactive compounds. Thus, polyvalent metal compounds are recommended in U.S. Pat. No. 4,043,952 to improve the dispersibility in water, and glyoxyl is recommended in U.S. Pat. No. 4,051,086 to improve the rate of absorption. The document EP-A 83022 (for improving dispersibility in water and for improving the absorption capacity), DE-A 3331644 (for improving the resistance to salt solutions at a high rate of absorption of water), DE-A 3507775 (likewise to increase the resistance to salts with good absorption of liquid and gel strength), DE-A 3523617 (for improving the flowability and preventing caking together), DE-A 3628482 (for improving the absorption of water during repeated use) and EP-A 349240 (for achieving an equilibrium between absorption capacity and rate of absorption as well as gel strength and absorbency) describe the after-treatment of polymers with crosslinking agents containing bi- or polyfunctional groups, which can react with the carboxyl or carboxylate groups or other groups contained in the polymer. In this case, either the powder is mixed directly with the components, if appropriate co-using relatively small amounts of water and solvent, or the powder is dispersed in an inert solvent, or polymers comprising 10 to 40% by weight of water are dispersed in a hydrophilic or hydrophobic solvent and subsequently or simultaneously mixed with the crosslinking agent. Crosslinking agents which can be used are polyglycidyl ethers, haloepoxy compounds, polyols, polyamines or polyisocyanates (see U.S. Pat. No. 4,666,983). In addition to these, DE-A 3314019, EP-A 317106 (in each case for achieving a high amount absorbed and high rate of absorption) and DE-A 3737196 (high absorption capacity and high rate of absorption with a simultaneously high gel strength) furthermore mention polyfunctional aziridine compounds, alkyl di-(tri)-halides and oil-soluble polyepoxy compounds. In DE-A 3503458 (to achieve a polymer having a good water absorption capacity, a high rate of absorption of water and high gel strength with a non-tacky gel), a crosslinking agent is applied to a polymer resin in the presence of an inert inorganic powder material, such as $SiO_2$, without using organic solvents. All these processes have the common feature that the resins are then subjected to heat treatment, and furthermore that the crosslinking agents used for the surface treatment contain at least two functional groups, i.e. are reactive. DE-A 4020480 describes a process for surface crosslinking of hydrophilic absorbents by treatment with alkylene carbonates and subsequent heat treatment at 150°–300° C. EP-A 509708 describes a process which comprises surface crosslinking of polymer particles containing carboxyl groups with polyhydroxy compounds in combination with a surfactant coating.

All these polymer powders prepared by the methods described above have the common feature that they comprise a certain proportion of finer particles, which are responsible for the so-called dusting, and that in some cases these dust contents are increased significantly as a result of mechanical stress, such as, for example, by pneumatic conveying and the abrasion caused thereby. Fine dust having a particle size of less than 10 µm is undesirable for inhalation toxicity reasons, and fine dust constituents smaller than 100 µm cause visually detectable dusting with all its consequences and lead to handling problems in production and processing operations, and are therefore likewise undesirable.

It should furthermore be stated that, in various commercially available superabsorber products, the abrasion caused by mechanical stress not only increases the dust content of the products but also causes a deterioration in the physico-chemical product properties.

The object of the present invention is thus to provide dust-free abrasion-resistant highly swellable absorbents for aqueous liquids. This object is achieved, surprisingly, by coating hydrophilic, highly swellable hydrogels which are known per se with non-reactive, water-insoluble film-forming polymers.

The present invention thus relates to a hydrophilic, highly swellable hydrogel, characterized in that it is coated with a non-reactive, water-insoluble film-forming polymer.

Suitable polymers are, in particular, those which have a film formation capacity in the temperature range between −1° C. and 130° C. and at the same time form polymer films which are water-insoluble but permeable to water or swellable in aqueous solutions.

Suitable polymers furthermore are also in particular those which form polymer films which do not tend to stick in the temperature range between 0° C. and 80° C.

Finally, suitable polymers are in particular those which form polymer films which have tear strength values of 0.5 to 15 Newton/mm and elongation at break values of 100% to 1000%.

The polymers to be employed according to the invention are not reactive. In the context of the present invention, this means that they contain no reactive groups which can react with the carboxyl groups on the surface of the hydrogel particles.

Preferred polymers to be employed according to the invention are homo- and copolymers of vinyl esters, in particular vinyl acetate homopolymers and vinyl acetate copolymers with ethylene, acrylates, maleic acid esters, vinylamides and/or other vinylacyl derivatives.

Homo- and copolymers of acrylic and methacrylic acid esters, such as, for example, copolymers of methyl methacrylate and n-butyl acrylate or 2-ethylhexyl acrylate, are furthermore preferred.

The copolymers mentioned which are based on vinyl esters, acrylic acid esters and methacrylic acid esters can comprise, as further comonomers, for example, styrene, butadiene, vinylamides, olefinically unsaturated carboxylic acids and derivatives thereof, olefinically unsaturated sulphonic acids and derivatives thereof, vinylphosphonic acid and derivatives thereof, or polyglycol esters of unsaturated acids.

Examples of vinylamides are, in particular, N-vinylformamide, N-vinyl-N-methylacetamide and N-vinylpyrrolidone.

Examples of olefinically unsaturated carboxylic acids are, in particular, acrylic acid, methacrylic acid, itaconic acid and maleic acid, and also alkali metal, ammonia and amine salts thereof. Examples of derivatives of these olefinically unsaturated carboxylic acids are, in particular, amides, such as (meth)acrylamide, N-tert-butyl (meth) acrylamide and N-isopropyl(meth)acrylamide, and also N-methylolamides or ethers of N-methylolamides, hemiamides and imides of aliphatic amines, as well as acrylonitrile.

Examples of olefinically unsaturated sulphonic acids are the salts of vinylsulphonic acid, 2-acrylamido-2-methylpropane-sulphonic acid, styrenesulphonic acid, and allyl- and methallyl-sulphonic acid, in particular the alkali metal, ammonium and amine salts thereof.

Examples of derivatives of vinylphosphonic acid are, in particular, the mono- and diesters of $(C_1-C_{18})$-alcohols, such as, for example, the methyl, propyl or stearyl esters. Vinyl-phosphonic acid itself is present, in particular, as a mono- or disalt, the alkali metal, ammonium and amine salts being preferred.

Polyglycol esters of unsaturated acids are, in particular, hydroxyethyl(meth)acrylate or esters of acrylic and methacrylic acid with polyalkylene oxide compounds of the general formula

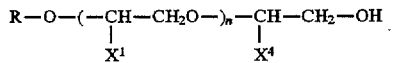

wherein $X^1$ is hydrogen or methyl,
n is 0 to 50, and
R is an aliphatic, araliphatic or cycloaliphatic $(C_1-C_{24})$-radical, for example nonylphenyl.

Preferred polymers to be employed according to the invention are furthermore film-forming polymers based on polyacetals, i.e. reaction products of polyvinyl alcohols with aldehydes, such as, for example, butyraldehyde, polyurethanes, i.e. from polymers accessible by polyaddition from alcohols which are dihydric or more than dihydric and isocyanates, for example prepared from polyester- and/ or polyetherdiols and, for example, toluene-2,4- or 2,6-diisocyanate, methylene-4,4-di(phenyl isocyanate) or hexamethylene diisocyanate (see ales in Rouben-Weyl E20/2, 1561–1721), polyureas, i.e. polymers which are accessible by polyaddition of diamines and diisocyanates or by polycondensation of diamines with carbon dioxide, phosgene, carboxylic acid esters (for example activated diphenyl carbonates) or urea, or by reaction of diisocyanates with water (see Houben-Weyl E20/2, 1722), polysiloxanes, the base polymer used being, in particular, linear dimethylpolysiloxane, the end groups of which can be blocked in different ways (see "Chemie und Technologie des kalthärtenden Siliconkautschuks" ("Chemistry and Technology of Cold-curing Silicone Rubber"), 49–64 in SILICONE—Chemie und Technologie (SILICONES— Chemistry and Technology), (Symposium of 28.04.89) VULKAN-VERLAG, Essen), polyamides, copolyamides (see Plaste Kautsch. 25, 440–444 (1978) such as are used, for example, for the preparation of paints, being preferred, polyesters, i.e. polymers which are prepared by ring-opening polymerization of lactones or by polycondensation of hydroxycarboxylic acids or of diols and dicarboxylic acid derivatives (see Houben-Weyl E20/2, 1404–1429), ps epoxy resins which can be prepared from polyepoxides by polyaddition reactions with suitable curing agents or by polymerization by way of epoxide groups (in this context, see Souben-Weyl 14/2, 462–552 and E20, 1891–1994 (examples are reaction products from bisphenol A with epichlorohydrin)), or based on polycarbonates such as can easily be prepared by reaction of diglycols or bisphenols with phosgene or carbonic acid diesters in polycondensation or transesterification reactions (see Houben-Weyl E20/2, 1443–1457).

Polymers which are particular preferably to be employed according to the invention are homo- and copolymers of acrylic and methacrylic acid esters and polymers based on polyacetals.

If they can form suitable films, mixtures of two or more of the abovementioned polymers can also be employed. The mixture ratios here are entirely non-critical and are to be adapted to the particular circumstances.

The film-forming polymers are preferably employed in amounts of 0.1 to 40% by weight, particular preferably in amounts of 0.5 to 20% by weight, based on the hydrogel according to the invention.

The hydrophilic, highly swellable hydrogels on which the hydrogels according to the invention are based are, in particular, polymers of (co)polymerized hydrophilic monomers, graft (co)polymers of one or more hydrophilic monomers on a suitable graft base, crosslinked cellulose ethers or starch ethers, or naturally occurring products which are swellable in aqueous liquids; such as, for example, guar derivatives. These hydrogels are known and are described, for example, in the literature references cited above.

Suitable hydrophilic monomers are, for example, acids which are capable of polymerization, such as acrylic acid, methacrylic acid, vinylsulphonic acid, vinylphosphonic acid, maleic acid, including its anhydride, fumaric acid, itaconic acid, 2-acrylamido-2-methylpropanesulphonic acid, 2-acrylamido-2-methylpropanephosphonic acid, and amides thereof, hydroxyalkyl esters thereof and esters and amides thereof containing amine groups or ammonium groups. Furthermore water-soluble N-vinylamides, or else diallyldimethylammonium chloride.

Preferred hydrophilic monomers are compounds of the general formula I

wherein $R^1$ is hydrogen, methyl or ethyl, $R^2$ is the group —COOR$^4$, the sulphonyl group, the phosphonyl group, the phosphonyl group esterified with $(C_1-C_4)$-alkanol or a group of the formula

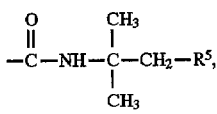

R³ is hydrogen, methyl, ethyl or the carboxyl group,

R⁴ is hydrogen, amino or hydroxy-($C_1$–$C_4$)-alkyl, and

R⁵ is the sulphonyl group, the phosphonyl group or the carboxyl group.

Particularly preferred hydrophilic monomers are acrylic acid and methacrylic acid.

Suitable graft Bases can be of natural or synthetic origin. Examples are starch, cellulose or cellulose derivatives, as well as other polysaccharides and oligosaccharides, polyalkylene oxides, in particular polyethylene oxides and polypropylene oxides, and also hydrophilic polyesters.

Suitable polyalkylene oxides have, for example, the formula

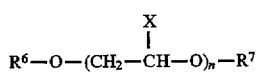

wherein $R^6$ and $R^7$, independently of one another, are hydrogen, alkyl, alkenyl or aryl, X is hydrogen or methyl, and n is an integer from 1 to 10000.

$R^6$ and $R^7$ are preferably hydrogen, ($C_1$–$C_6$)-alkyl, ($C_2$–$C_6$)-alkenyl or phenyl.

Preferred hydrogels are, in particular, polyacrylates, polymethacrylates and the graft polymers described in U.S. Pat. No. 4,931,497, U.S. Pat. No. 5,011,892 and U.S. Pat. No. 5,041,496. The content of these Patents is expressly also a constituent of the present disclosure.

The hydrophilic, highly swellable hydrogels on which the hydrogels according to the invention are based are preferably crosslinked, i.e. they contain compounds having at least two double bonds, which are polymerized into the polymer network.

Suitable crosslinking agents are, in particular, methylene bis-acrylamide or -methacrylamide, esters of unsaturated mono- or polycarboxylic acids with polyols, such as diacrylate or triacrylate, for example butanediol diacrylate or methacrylate or ethyleneglycol diacrylate or methacrylate, as well as trimethylolpropane triacrylate, and allyl compounds, such as allyl (meth)acrylate, triallyl cyanurate, diallyl maleate, polyallyl esters, tetraallyloxyethane, triallylamine, tetraallylethylenediamine, allyl esters of phosphoric acid and vinylphosphonic acid derivatives, such as are described, for example, in EP-A 343 427. The content of EP-A 343 427 is expressly also a constituent of the present disclosure.

The hydrophilic, highly swellable hydrogels on which the hydrogels according to the invention are based are furthermore particularly preferably after-crosslinked in the aqueous gel phase in a manner known per so, or surface crosslinked as ground and sieved polymer particles. Suitable crosslinking agents for this purpose are compounds which contain at least two groups which can form covalent bonds with the carboxyl groups of the hydrophilic polymer. Suitable compounds are, for example, di- or polyglycidyl compounds, such as diglycidyl phosphonates, alkoxysilyl compounds, polyaziridines, polyamines or polyamidoamines, it also being possible for the compounds mentioned to be used as mixtures with one another (see, for example, EP-A 83 022, EP-A 543 303 and EP-A 530 438). Polyamidoamines which are suitable as crosslinking agents are described, in particular, in EP-A 349 935. The content of the abovementioned Patent applications is expressly also a constituent of the present disclosure.

The hydrophilic, highly swellable hydrogels on which the hydrogels according to the invention are based can be prepared by known polymerization processes. Polymerization in aqueous solution by the process of so-called gel polymerization is preferred. In this process, 15 to 50% strength by weight aqueous solutions of one or more hydrophilic monomers and, if appropriate, of a suitable graft base are polymerized in the presence of a free radical initiator, preferably without mechanical mixing, utilizing the Trommsdorff-Norrish effect (Bios Final Rep. 363.22; Makromol. Chem. 1, 169 (1947)).

The polymerization reaction can be carried out in the temperature range between 0° C. and 130° C., preferably between 10° C. and 100° C., either under normal pressure or under increased pressure. As is customary, the polymerization can also be carried out under an inert gas atmosphere, preferably under nitrogen.

The hydrogels according to the invention can be prepared by a procedure in which the non-reactive, water-insoluble film-forming polymers are applied in a manner known per se, in the desired weight ratio, to the hydrophilic, highly swellable hydrogels on which they are based. This application is preferably effected in mixers, such as, for example, twin drum mixers, so-called "ZIG-ZAG" mixers, horizontally operating plough-share mixers, such as, for example, Lödige mixers or cone-screw mixers, or perpendicularly cylindrical mixers having coaxially rotating blades, or else fluidized bed mixers.

The non-reactive, water-insoluble film-forming polymers are preferably employed here in the form of an aqueous polymer dispersion, polymer emulsion or polymer suspension. However, they can also be employed in the form of a solution in an organic solvent or in a mixture of water and an organic water-miscible solvent. The aqueous dispersions, emulsions and suspensions mentioned can also have a content of organic, optionally water-miscible solvent.

Suitable organic solvents are, for example, aliphatic and aromatic hydrocarbons, alcohols, ethers, esters and ketones, such as, for example, n-hexane, cyclohexane, toluene, xylene, methanol, ethanol, i-propanol, ethylene glycol, 1,2-propandiol, glycerol, diethyl ether, methyltriglycol, polyethylene glycols having an average molecular weight Mw of 200–10,000, ethyl acetate, n-butyl acetate, acetone and 2-butanone.

Suitable water-miscible organic solvents are, for example, aliphatic ($C_1$–$C_4$)-alcohols, such as, for example, methanol, i-propanol and t-butanol, polyhydric alcohols, such as, for example, ethylene glycol, 1,2-propanediol and glycerol, ethers, such as, for example, methyltriglycol and polyethylene glycols having average molecular weights Mw of 200–10,000, and also ketones, such as, for example, acetone and 2-butanone.

The hydrogels according to the invention are distinguished by an outstanding mechanical stability, in particular abrasion resistance. This particularly applies in association with incorporation into hygiene articles. Furthermore, they display only a minimum dust development.

They are therefore outstandingly suitable as absorbents for water and aqueous liquids, such as urine or blood, in hygiene articles, such as baby and adult nappies, sanitary towels, tampons and the like. However, they can also be used as soil improvement agents in agriculture and horticulture, as moisture-binding agents in cable sheathing and for thickening aqueous waste.

The abrasion resistance of the hydrogels according to the invention, which are described in the following examples, was determined. This was carried out in a cylindrical porcelain mill having an internal diameter of 11 cm, an internal height of 11.5 cm, a capacity of about 1100 ml and associated metal beads (32 having a diameter of in each case about 0.9 cm and a weight of in each case about 16.5 g and 1 having a diameter of about 6.4 cm and a weight of about 1324 g) with a total weight of about 1852 g. The vessel was filled with the beads and in each case 100 g of the polymer powder to be tested, closed and rolled on an appropriate roller drive for 30 minutes at 60 revolutions per minute. The polymer powder was subjected to a sieve analysis before and after this treatment, the content in the lower particle size range and the absorption under load (AUL) under different pressure loadings and surface covering being determined in particular.

The absorption under load was determined in a known manner, as described, for example, in EP-A 339 461.

EXAMPLE 1

200 g of methanol were initially introduced into a 1000 ml round-bottomed flask, 2.0 g of the commercial product ®Mowital B30T (®Mowital is a registered trademark of Hoechst AG, Frankfurt am Main, Federal Republic of Germany), a polyacetal based on a polyvinylbutyral having a low degree of acetalization, were dissolved therein, 200 g of a superabsorber, prepared analogously to Example 5 of DE-A 4138408, were added, and the whole was mixed homogeneously on a rotary evaporator by rotating at a moderate speed for 15 minutes. The methanol was then distilled off under reduced pressure and the powder was subsequently dried at 50° C. in a drying cabinet in vacuo to remove the residual methanol. Any lumps formed were removed by sieving through a sieve of 0.85 mm mesh width.

The abrasion resistance of this product was determined as described above. The absorption under load was determined under a pressure loading of 60 g/cm² at a surface covering of 0.02 g/cm², a particle size fraction of 0.3 to 0.6 mm being used. The result is given in Table 1.

The experiment described above was repeated with two further commercially available types of ®Mowital. The results are likewise given in Table 1.

TABLE 1

| ®Mowital type | before abrasion test | | after abrasion test | |
|---|---|---|---|---|
| | AUL | particle content <0.2 mm | AUL | particle content <0.2 mm |
| no after-treatment | 22.2 | 14.2 | 12.2 | 20.0 |
| B 30 T | 24.6 | 7.1 | 15.2 | 14.6 |
| B 60 T | 24.8 | 7.0 | 15.1 | 14.1 |
| B 69 SF | 24.4 | 4.3 | 16.5 | 14.4 |

EXAMPLE 2

50 g of superabsorber granules, which were after-crosslinked on the surface and were prepared analogously to Example 10 of DE-A 4138408, were initially introduced into a 500 ml round-bottomed flask, 2 g of the commercial product ®Mowilith dispersion LDM 7460 (®Mowilith is a registered trademark of Hoechst AG, Frankfurt am Main), a plasticizer-free, aqueous dispersion based on acrylic and methacrylic acid esters, diluted with 30 g of methanol, were added and the whole was mixed homogeneously on a rotary evaporator by rotating at a moderate speed for 15 minutes. The methanol was then distilled off under reduced pressure and the powder was subsequently dried at 50° C. in a drying cabinet in vacuo to remove the residual methanol. Any lumps formed were removed by sieving through a sieve of 0.85 mm mesh width. The abrasion resistance of this product was determined as described in Example 1.

The experiment was repeated with three further types of ®Mowilith. The results are given in Table 2.

TABLE 2

| ®Mowilith type | before abrasion test | | after abrasion test | |
|---|---|---|---|---|
| | AUL | particle content <0.2 mm | AUL | particle content <0.2 mm |
| no after-treatment | 16.9 | 13.5 | 12.6 | 22.5 |
| LDM 7460 | 21.8 | 8.1 | 19.5 | 12.5 |
| LDM 7410 | 17.9 | 10.2 | 15.9 | 15.4 |
| DH 257 | 20.7 | 7.5 | 18.3 | 13.0 |
| DM 1062 | 21.5 | 6.2 | 19.6 | 12.7 |

EXAMPLE 3

1 kg of superabsorber, prepared analogously to Example 5 of DE-A 4138408, was initially introduced into a Telschig laboratory spray mixer RSM 6-60 of 6 l capacity. A mixture of 20 g of ®Mowilith dispersion LDM 7460 and 13 g of water was sprayed on in the course of 5 minutes with the aid of a two-component nozzle, while mixing, and the whole was subsequently mixed for 3 minutes. The product was then subsequently dried in a drying cabinet at 140° C. for 30 minutes. Any lumps formed were removed by sieving through a sieve of 0.85 mm mesh width. The abrasion resistance of this product was determined as described in Example 1, but the AUL was measured under a pressure loading of 40 g/cm² at a surface covering of 0.032 g/cm².

The experiment was repeated with three further types of ®Mowilith. The results are given in Table 3.

TABLE 3

| ®Mowilith type | before abrasion test | | after abrasion test | |
|---|---|---|---|---|
| | AUL | particle content <0.3 mm | AUL | particle content <0.3 mm |
| no after-treatment | 23.0 | 19.5 | 15.9 | 29.3 |
| LDM 7460 | 28.2 | 14.1 | 27.4 | 20.0 |
| LDM 7751 | 23.7 | 16.2 | 19.2 | 22.5 |
| LDM 7736 | 22.1 | 15.8 | 18.6 | 21.4 |
| DH 257 | 27.8 | 13.8 | 26.2 | 18.9 |

We claim:

1. Hydrophilic, highly swellable hydrogel, comprising a covalent crosslinked hydrophilic swellable hydrogel made from (co) polymerized hydrophilic monomers on a graft base or naturally occurring products which are swellable in aqueous liquid, coated with a non-reactive, water-insoluble film-forming polymer which forms a film on the hydrogel and said polymer has a film formation capacity in the temperature range between about −1° C. and about 130° C. and at the same time forms polymer films which are water-insoluble but permeable to water or swellable in aqueous solutions.

2. The hydrogel according to claim 1, wherein the polymer has a film formation capacity in the temperature range between about −1° C. and about 130° C. and at the same time forms polymer films which are water-insoluble but permeable to water in aqueous solutions.

3. The hydrogel according to claim 1, wherein the polymer forms a polymer film having a tear strength value of about 0.5 to about 15 Newton/mm and an elongation at break value of about 100% to about 1000%.

4. The hydrogel according to claim 1, wherein the polymer is a homo- or copolymer of vinyl esters.

5. The hydrogel according to claim 1, wherein the polymer is in amounts of about 0.1 to about 40% by weight, based on the hydrogel.

6. The hydrogel according to claim 1, wherein the hydrogel is based on a polymer of (co)polymerized hydrophilic monomers, a graft (co)polymer of one or more hydrophilic monomers on a graft base, a crosslinked cellulose ether or starch ether, or a naturally occurring substance which is swellable in aqueous liquids.

7. The hydrogel according to claim 2, wherein said polymer film does not stick in the temperature range between about 0° C. to about 80° C.

8. The hydrogel according to claim 5, wherein the polymer is in an amount from about 0.5 to about 20%, by weight based on the hydrogel.

9. A process for the preparation of a hydrophilic, highly swellable hydrogel, comprising coating a covalent crosslinked hydrophilic swellable hydrogel made from (co)polymerized hydrophilic monomers, graft (co)polymers of one or more hydrophilic monomers on a graft base or naturally occurring products which are swellable in aqueous liquid, with a non-reactive, water-insoluble film-forming polymer comprising applying a non-reactive, water-insoluble film-forming polymer to the hydrophilic, highly swellable hydrogel on which it is based, to form a film on the hydrogel.

10. An absorbent for water and aqueous liquids comprising the hydrogel according to claim 1.

* * * * *